(12) United States Patent
Jensen et al.

(10) Patent No.: US 7,610,850 B2
(45) Date of Patent: Nov. 3, 2009

(54) APPARATUS FOR SLICING APPLES

(75) Inventors: Frank E. Jensen, Pueblo West, CO (US); Tim R. Vaughan, Pueblo West, CO (US); David C. Bullock, Pueblo, CO (US); William L. Thompson, Jr., Pueblo, CO (US)

(73) Assignee: Atlas Pacific Engineering Company, Pueblo, CO (US)

( * ) Notice: Subject to any disclaimer, the term of this patent is extended or adjusted under 35 U.S.C. 154(b) by 263 days.

(21) Appl. No.: 11/471,207

(22) Filed: Jun. 20, 2006

(65) Prior Publication Data

US 2006/0283339 A1 Dec. 21, 2006

Related U.S. Application Data

(60) Provisional application No. 60/692,556, filed on Jun. 21, 2005.

(51) Int. Cl.
*A23N 3/00* (2006.01)
(52) U.S. Cl. .......................................... 99/545; 99/543
(58) Field of Classification Search ........... 99/537–538, 99/540–545, 584, 506–508; 30/302–304
See application file for complete search history.

(56) References Cited

U.S. PATENT DOCUMENTS

| | | | | |
|---|---|---|---|---|
| 2,496,637 A | * | 2/1950 | Pease | 99/553 |
| 2,703,122 A | * | 3/1955 | Pease et al. | 99/553 |
| 2,750,976 A | * | 6/1956 | Ganze | 99/553 |
| 3,696,847 A | * | 10/1972 | Erekson et al. | 99/545 |
| 4,007,676 A | * | 2/1977 | Ellis | 99/545 |
| 5,520,105 A | * | 5/1996 | Healy | 100/98 R |

* cited by examiner

*Primary Examiner*—Timothy F. Simone
(74) *Attorney, Agent, or Firm*—Bruce H. Johnsonbaugh

(57) ABSTRACT

An apparatus for slicing apples is provided. The slicer utilizes thinner blades than known in the art, with a thickness less than 300 microns, and preferably between 180 and 220 microns. Each of the thinner blades is supported against bending, warping or twisting by a novel clinch buckle which rigidly supports the outer end or ends of each blades. The clinch buckle is rigidly connected to bent tabs formed at the outer end or ends of each blade and supports the outer ends across the full width of the blades. The clinch buckle is supported by an outer blade support ring and is captured by the outer support ring to prevent rotation of the clinch buckle. The thinner blade reduces cell damage, reduces the amount of sealant or neutralizer needed to slow or prevent oxidation of enzymes released from cells ruptured by slicing, and delays the onset of browning. A serrated blade is used to further reduce the extent of cell damage.

8 Claims, 14 Drawing Sheets

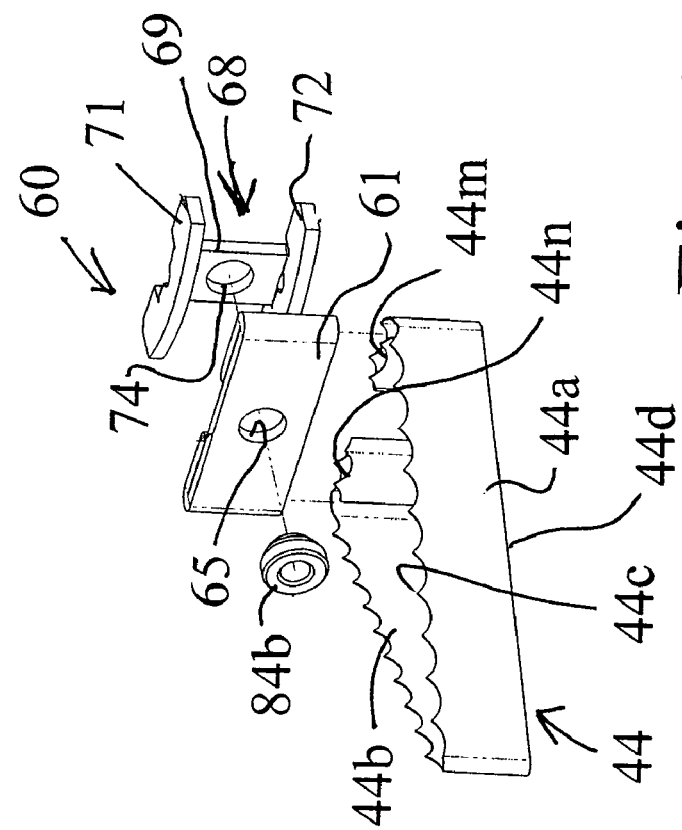
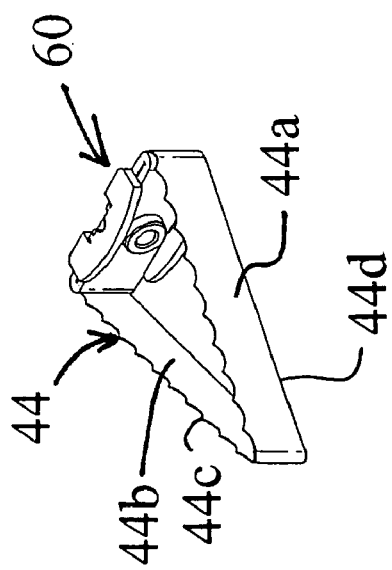

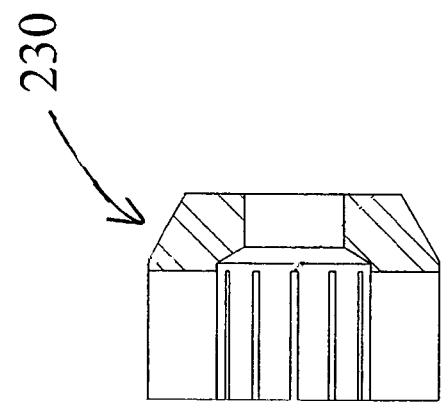
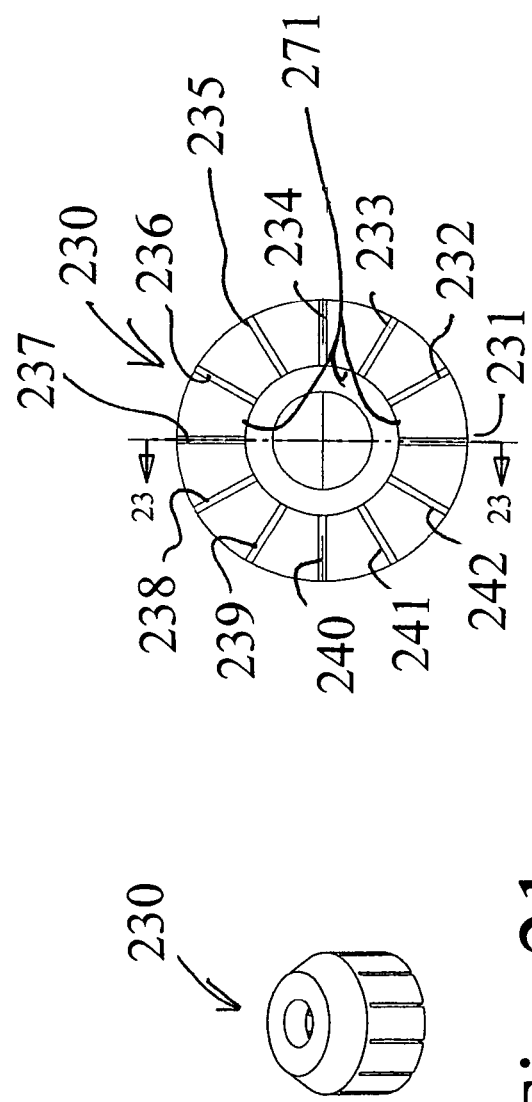
Fig. 23
Fig. 22
Fig. 21

APPARATUS FOR SLICING APPLES

CROSS-REFERENCE TO RELATED APPLICATION

This application claims the benefit of and priority from U.S. provisional application Ser. No. 60/692,556 filed on Jun. 21, 2005.

BACKGROUND AND BRIEF DESCRIPTION OF INVENTION

The present invention relates generally to slicing of apples. The present invention is designed to automatically slice apples into wedges for use in packaged fruit salads sold in restaurants or in packaged sliced fruit sold, for example, in supermarkets. More particularly, the present invention relates to an apparatus for optimizing the slicing of apples which results in minimum cell damage to the apple which, in turn, extends the shelf-life of packaged apple slices.

The demand for packaged fruit salads or packaged fresh sliced apples has grown dramatically. Consumers having less time available for preparing meals and greater concern for eating fresh fruit have increased the demand for packaged fruit salads. The single largest problem in selling packaged, sliced apples is that the apple slices turn brown over time and become unacceptable to consumers.

The browning of freshly cut apples is caused by oxidation of one or more enzymes released from apple cells that are cut open or ruptured during the slicing operation. The enzymes are liquid and tend to spread across the freshly cut apple surface. As those enzymes oxidize, they turn brown. This oxidation process is described in detail in U.S. Pat. No. 6,054,160 at column 1, line 13 through column 3, line 16, incorporated herein by reference.

The prior art includes various attempts to delay or prevent the browning of sliced apples.

For example, the prior art includes a variety of liquids that are applied to sliced apples in an attempt to neutralize the enzymes or to otherwise delay the onset of browning (see U.S. Pat. Nos. 5,922,382; 5,914,143; 5,939,117; 5,922,382 and 6,054,160. The primary disadvantage of this approach is that the apple slices tend to absorb the applied liquid (which is usually applied in the form of a bath or spray) and become "waterlogged," losing their crispness and desirability, thereby becoming unacceptable to consumers.

The prior art also includes the use of transparent plastic covers for packaged salads or apple slices to reduce the amount of oxygen in the ambient air that reaches the sliced apple surfaces (see U.S. Pat. Nos. 5,922,382 and 6,054,160). This technique covers the entire packaged salad (rather than sealing each cut surface), allowing ambient oxygen inside the package to react with the freshly cut apple surfaces. Furthermore, such transparent covers are relatively expensive and not totally impermeable to air and allow oxygen and air to pass through over time.

In fact, the prior art includes several genetically engineered species of apple tree wherein the apples have a delayed onset of browning after being sliced (see U.S. plant patents 4,956; 7,857; 13,930 and U.S. 2006/0053517P1). The difficulty with a genetically engineered apple is that the taste does not satisfy the large majority of consumers who favor the taste of known varietals such as Fuji, Granny Smith, Delicious and a host of others.

The prior art includes U.S. Pat. No. 4,007,676, owned by the assignee of the present application. The '676 patent teaches an apple slicer for cutting wedge shaped apple slices. The blades have a thickness of about 0.020 inch (or 500 microns) and are tensioned by a pair of screws (see column 9, lines 48-69). Applicants have found that simply tensioning the blade with the tensioning screws of the '676 patent is inadequate when using blades thinner than 500 microns.

The problem addressed by the present invention is how known varieties of apples can be sliced and packaged in a manner to delay the onset of browning while preserving crispness and taste.

The present invention significantly delays the onset of browning while preserving crispness and taste. A key aspect of the present invention is the use of a significantly thinner blade than heretofore used in automatic apple slicing machines. The thinner blade must be used together with a novel system for supporting and tensioning the blade to resist bending, warping and twisting as described below. The thickness of the blade utilized in the present invention is roughly equivalent to the diameter of most apple cells, i.e., less than 300 microns and preferably about 200 microns. As shown in FIG. 27, typical apple cells are roughly 250-300 microns in width. FIG. 27 is a reproduction of FIG. 1 from a paper entitled "Cell Boundary Detection and Volume Approximation of Confocal Microscope Images for Quantitative Analysis of Osmotically Dehydrated Plant Tissues" available at http://www.kremer.ca/Publications or http://www.kremer.ca/Publications/Papers/Applespiderpaper.pdf.gz The significance of FIG. 27 is that it illustrates that the present invention has reduced the blade thickness by roughly the width of a typical apple cell. A reduction of such magnitude will inherently reduce the amount of apple cell damage caused by the slicing operation. Applicants are not aware of prior art apple slicing blades having a thickness less than about 500 microns. As shown and described below, the use of a 200 micron thick blade cuts or ruptures less than half the cells that are cut or ruptured by a prior art blade of 500 micron thickness. The swath or kerf of the thinner blade is less than half that of a 500 micron thick blade. The reduction of the number of cut or ruptured apple cells inherently delays the onset of browning by reducing the amount of oxidizable enzymes released by cut or ruptured cells. The reduced volume of oxidizable enzymes is neutralized by known agents applied in much lower quantities than utilized in prior art apple slicers, thereby avoiding "waterlogged" apple slices while preserving crispness and a fresh appearance. Additionally, significant cost savings are realized by the use of a smaller volume of sealant and/or neutralizing agents.

We have found that the use of a significantly thinner blade than used in the prior art automatic apple slicers requires the use of a novel and robust clinch buckle support for the outer end or ends of each blade, along with adjustable blade tensioning, described below in detail. The supporting and tensioning of each blade prevents the blade from twisting, bending or warping as the slicing is done. It is critical to avoid twisting, bending or warping of the blade, since those movements of the blade greatly increase cell damage and usually result in apple slices with distorted and unacceptably cut surfaces.

A first embodiment of the present invention utilizes a plurality of generally V-shaped blades having bent tabs at the outer ends or tips of the legs of each blade, wherein each blade is independently supported and tensioned. The apex (or "inner end") of each V-shaped blade is supported by a central hub; the bent tabs formed at the two outer ends of the blade are rigidly connected to and supported by a clinch buckle to stiffen the blade. Furthermore, each clinch buckle is preferably "captured" between two surfaces of the outer blade support ring to prevent rotation of the clinch buckles, thereby further stiffening the blades. An adjustable tensioning device is used to move or draw the clinch buckle radially outwardly and away from the inner hub or blade apex toward the outer blade support ring In a second embodiment, a plurality of single blades extends between a central or inner hub and a cylindrical outer blade support ring. Both ends of the blade are firmly and rigidly supported. The outer ends of each blade are connected to a clinch buckle as briefly noted above, and each clinch buckle is in turn adjustably mounted to the outer blade support ring for blade tensioning. Each blade is separately and independently tensioned from the exterior of the outer blade support ring.

A primary object is to provide an apparatus for automatically slicing apples which minimizes apple cell damage and delays the onset of browning, while preserving crispness and taste.

A further object is to provide an apparatus for automatically slicing apples wherein a significantly thinner blade is used as compared with prior art apple slicers, and wherein the thinner blade is supported and tensioned to minimize and/or eliminate bending of the blade and to minimize apple cell damage.

Other objects and advantages of the invention will become apparent from the following description and drawings wherein:

BRIEF DESCRIPTION OF THE DRAWINGS

FIG. 3 is a perspective view of one of the V-shaped blades and clinch buckle utilized in the slicer shown in FIGS. 1 and 2;

FIG. 4 is an exploded view of the V-shaped blade and clinch buckle shown in FIG. 3;

FIG. 21 is a perspective view of the inner support hub of the embodiment illustrated in FIGS. 19 and 20;

FIG. 22 is a plan view of the inner support hub shown in FIG. 21;

FIG. 23 is a section on the line 23-23 of FIG. 22;

DETAILED DESCRIPTION OF THE DRAWINGS

Figure 1:
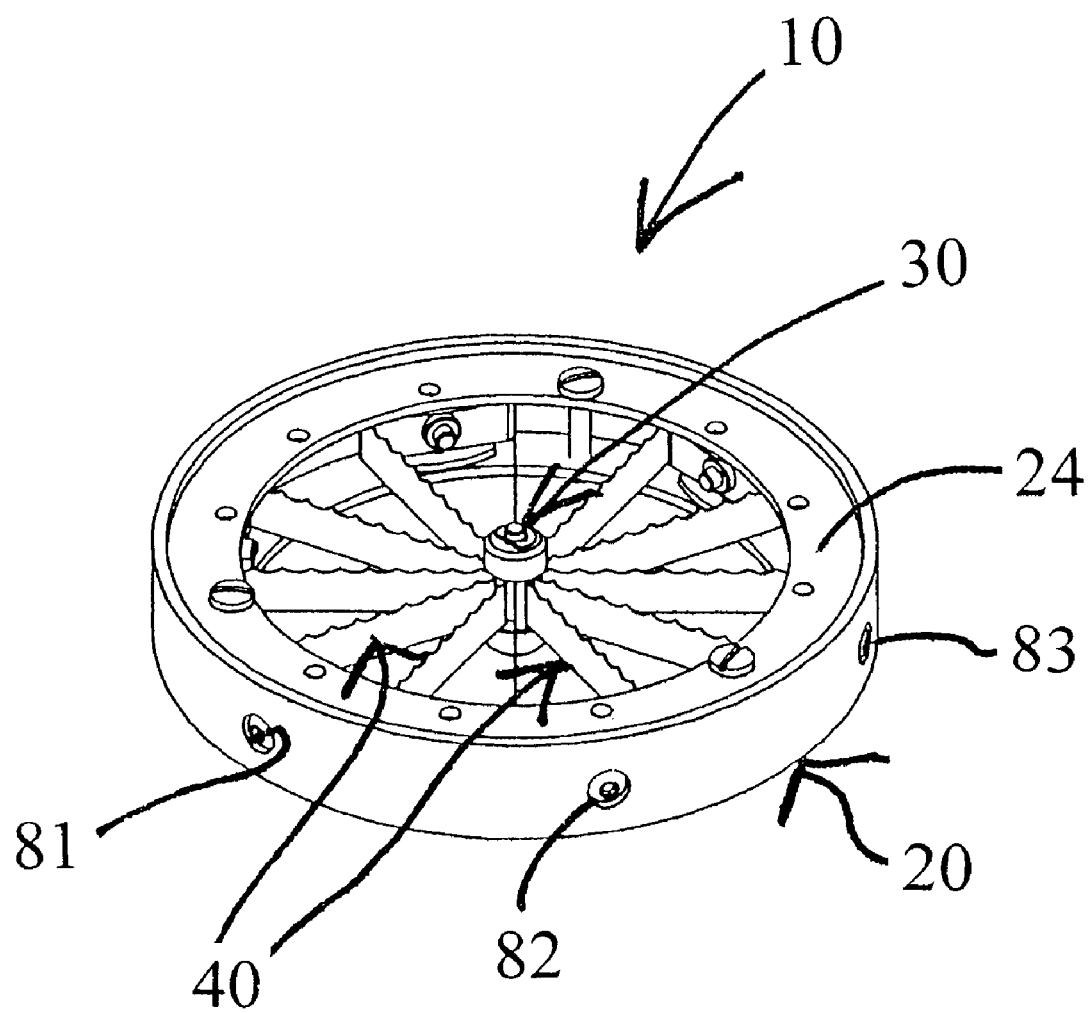
FIG. 1 is a perspective view of the first embodiment of the slicer assembly of the present invention.
Figure 2:
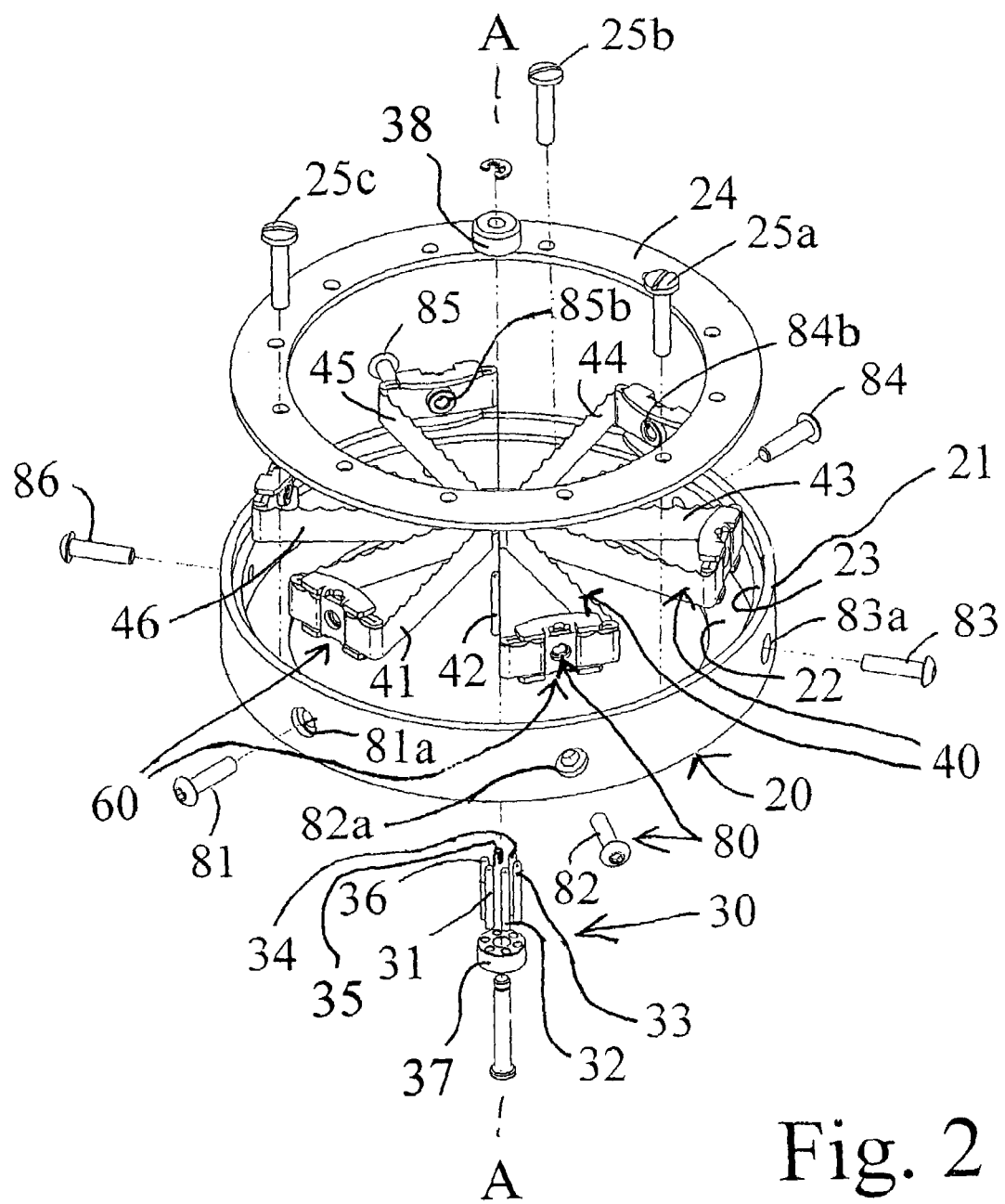
FIG. 2 is an exploded view of the assembly shown in FIG. 1.
Figure 5:
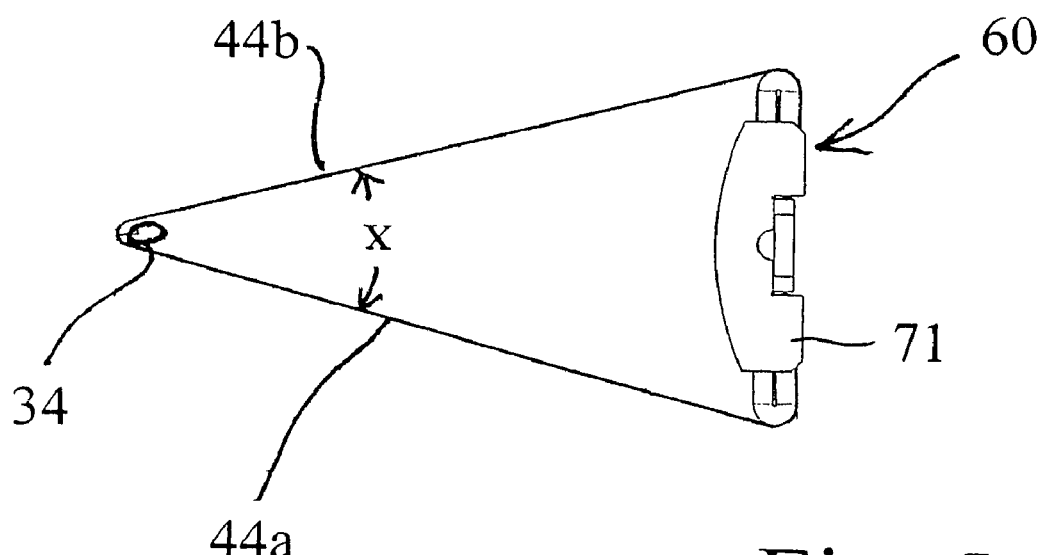
FIG. 5 is a top, plan view of the blade and clinch buckle shown in FIG. 3.

FIGS. 1-11 illustrate a first embodiment of apple slicer assembly 10 of the present invention. FIG. 1 is a perspective view of a fully assembled slicer 10 and FIG. 2 is an exploded view.

It is to be understood that the slicer assembly 10 is used in conjunction with an apple orienting, coring and slicing machine such as that shown in U.S. Pat. No. 4,007,676, incorporated herein by reference as though set forth in full. In the interest of brevity, the orienting, conveying and coring aspects of the apparatus are not repeated here. Some updated versions of the apparatus (not pertinent to the slicer assembly) of the '676 patent are available from Atlas Pacific Engineering Company of Pueblo, Colo., and are not repeated here.

As shown in FIGS. 1-11, wherein each reference numeral used refers to the same feature in each figure, an outer blade support ring 20 is provided, and an inner hub 30 is positioned preferably at the center of the circle formed by ring 20.

A circular array of blades 40 extends from inner blade support hub 30 radially outwardly toward cylindrical outer blade support ring 20. Each of the plurality of blades 40 is a single, continuous strip of resilient material, preferably stainless steel, having a thickness "t" (see FIG. 6) less than 300 microns, preferably in the range of 180 to 220 microns. Blades thinner than 200 microns may be utilized with the clinch buckle blade supports of the present invention. Applicants believe that the blade thickness can be reduced to 100 microns, and possibly less than 100 microns, utilizing the present invention. Each blade has a width "w" (see FIG. 9) preferably of between 0.45 and 0.50 inch. The width "w" may vary from 0.125 inch to 1.0 inch, without limitation. Each of the blades 40 is flat, and each blade is aligned parallel with axis A-A (FIG. 2), which is parallel with the direction in which the apples are moved through blade assembly 10, as is known in the art.

In the embodiment of FIGS. 1-11, the assembly 10 includes six identical generally V-shaped blades 41-46. V-shaped blade 44 is shown in detail in FIGS. 3-10. Blade 44 has first and second legs 44a and 44b, respectively, which form an apex angle x. Apex angle x varies, but in the embodiment shown in FIGS. 1-11, angle x is 30°. Blade 44 has upper and lower edges 44c and 44d; upper edge 44c is preferably serrated and lower edge 44d is flat.

Figure 6:
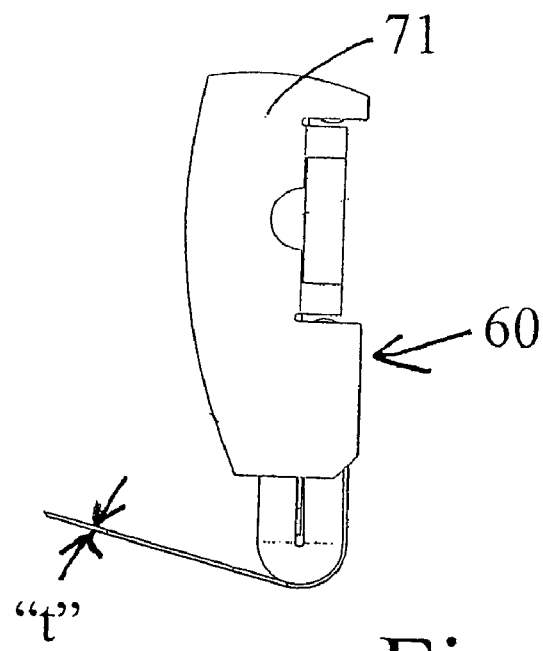
FIG. 6 is a plan view of the circle portion of FIG. 5.
Figure 7:
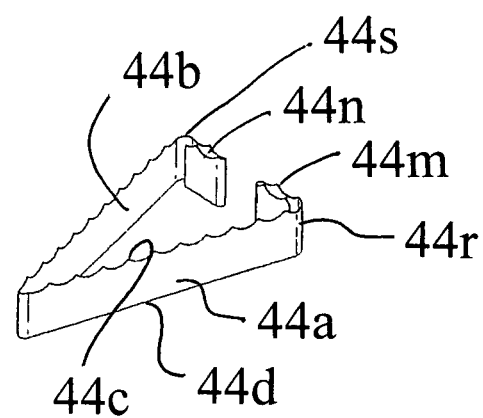
FIG. 7 is a perspective view of the V-shaped blade shown in FIG. 3, without the clinch buckle attached.
Figure 8:
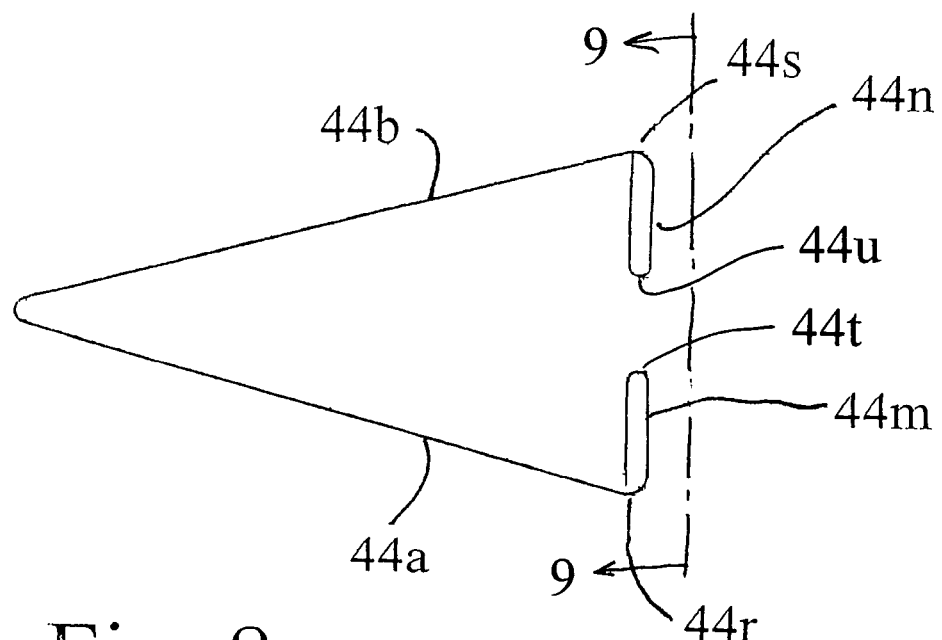
FIG. 8 is a plan view of the blade shown in perspective in FIG. 7.
Figure 10:
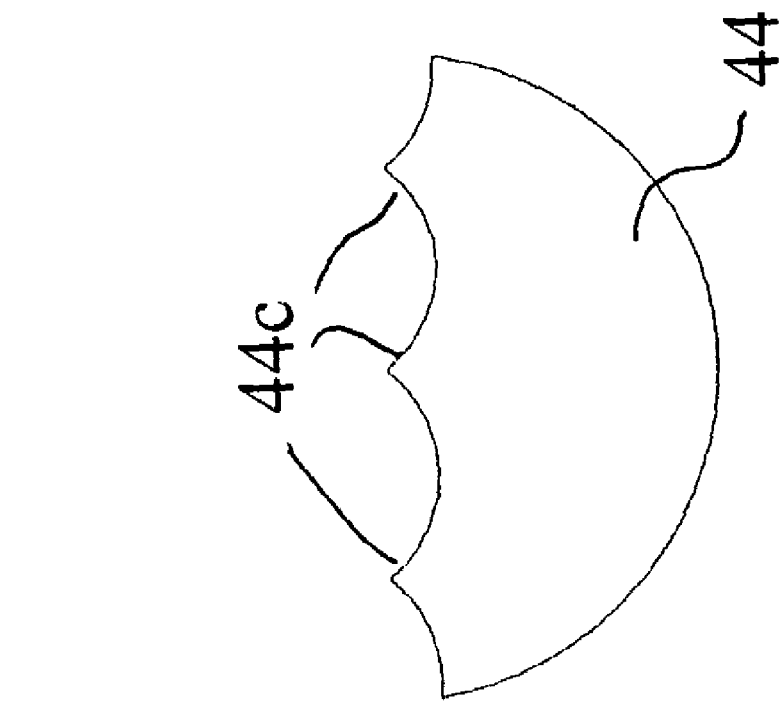
FIG. 10 is a closeup view of the serrated blade design used in the blade shown in FIGS. 3 and 7.
Figure 9:
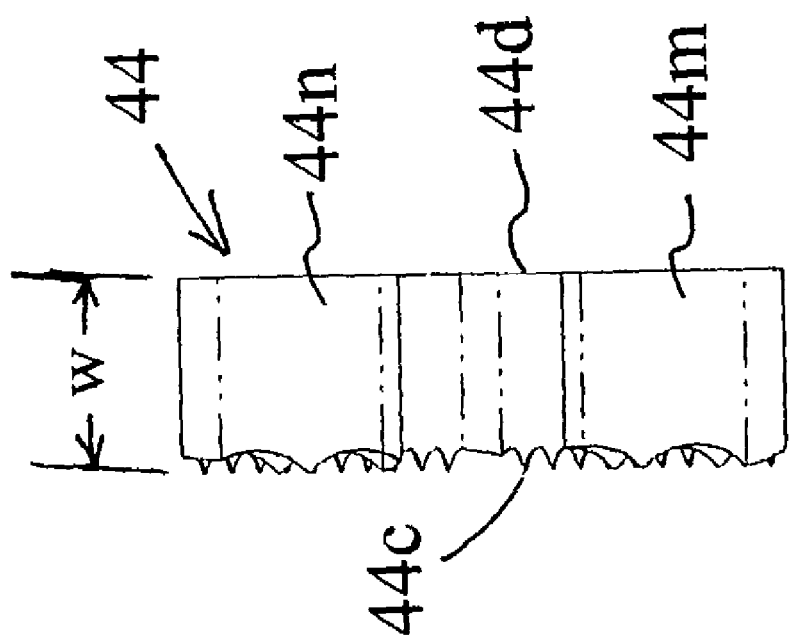
FIG. 9 is a side elevational view of the blade shown in FIGS. 7 and 8.
Figure 11:
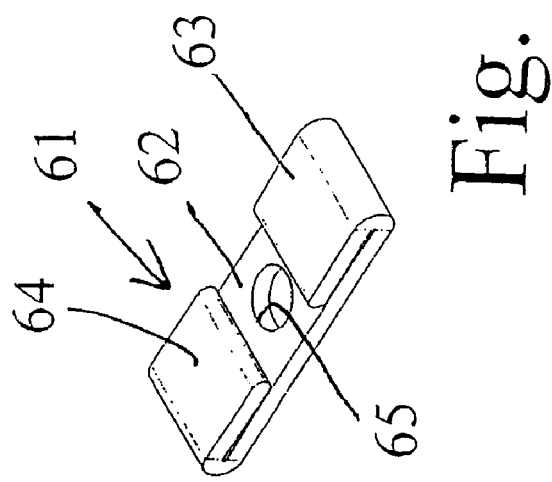
FIG. 11 is a perspective view of the clinch plate, one component of the clinch buckle.

As shown best in FIGS. 4, 7 and 8, each leg 44a and 44b has a bent tab 44m and 44n, respectively. Bent tabs 44m and 44n are preferably formed by bending the ends of blade 44 with two bends, a 180° bend shown as 44t and 44u, and a 75° bend at the tips 44r and 44s of legs 44a, 44b. Tabs 44m and 44n are dual layer, bent and folded tabs which are connected rigidly to clinch buckle means 60 described below. It is within the scope of the invention to utilize a single layer tab, but the preferred embodiment is shown in FIGS. 1-11. The bent tabs 44m and 44n have the same width "w" as the width of the legs 44a and 44b.

Clinch buckle means 60 is shown best in FIGS. 3-6. Each clinch buckle 60 includes a clinch plate 61 (FIG. 11), having a flat body 62, two 180° folded ears 63, 64, and a passageway 65 extending through body 62. The ears 63, 64 are sized and formed to slidably engage bent tabs 44m, 44n respectively, of blade 44 (see FIG. 4). Clinch buckle means 60 also includes buckle 68 having a flat body 69, top and bottom flanges 71 and 72 respectively, and passageway 74 formed in body 69. The purpose of buckle 68 is to help strengthen and rigidify the ultimate connection between clinch buckle 60 and blade 44. When clinch buckle 60 is assembled (see FIGS. 3, 5 and 6), the top and bottom flanges 71, 72 of buckle 68 extend across the top and bottom of clinch plate 61, and across tabs 44m and 44n. Fillet welds are applied in at least eight places to penetrate the upper and lower edges 44r, 44s of blade tabs 44m, 44n, the clinch plate 61 and the flanges 71, 72 of buckle 68. Two of the fillet welds 75 and 76 are shown in FIG. 6. Two welds are made on the bottom flange in the same location as welds 75, 76. Four similar fillet welds are made on bent tab 44n. The result is a robust, rigid connection for stiffening the legs 44a, 44b of blade 44, and greatly enhancing the resistance of blade 44 to flexing, bending and warping, especially after the blade is tensioned as described below.

Blade tensioning means 80 is shown partly in FIG. 2 and partly in FIG. 4. Tensioning screws 81-86 extend through passageways 81a-86a (of which 81a-83a are visible in FIG. 2) formed in outer blade support ring 20. Tensioning screws 81-86 extend through passageways 74 and 65 (FIG. 4) formed in buckle 68 and clinch plate 61 and threadably engage nuts 81b-86b (only nuts 84b and 85b are visible in FIG. 2), which are attached rigidly to (preferably by welding or cold forming) and carried by each clinch buckle 60. Nut 84b is shown in exploded form in FIG. 4.

It is significant to note that the outer blade support ring 20 includes a smooth, circumferential band 21, a bottom flange 22 to strengthen band 21, and an internal ledge or seat 23. Clinch buckles 60 seat against bottom flange 22. As top ring 24 is applied over clinch buckles 60 and held in its assembled position of FIG. 1, in which it seats against ledge 23, the clinch buckles 60 are "captured" between bottom flange 22 and top ring 24, i.e., the top and bottom flanges 71, 72 have minimum clearance (about 0.002 inch) from top ring 24 and bottom flange 22, respectively. The clinch buckles are thereby restrained and prevented from rotating, maximizing the rigidity of the connection between each clinch buckle 60 and each blade 41-46. The rigidity of this connection is significantly greater than the connection achieved in prior art U.S. Pat. No. 4,007,676 by screws 968 and 969 described in that patent. Those screws (i.e. 968 and 969) achieve tensioning of the prior art blade, but only provide limited resistance to bending and twisting of the prior art blades.

It is significant to note that although each clinch buckle means 60 is carried by outer support ring 20 and is captured between bottom flange 22 and top ring 24, the clinch buckles are free to slide radially inwardly and outwardly while the blades are being tensioned.

Figure 12:
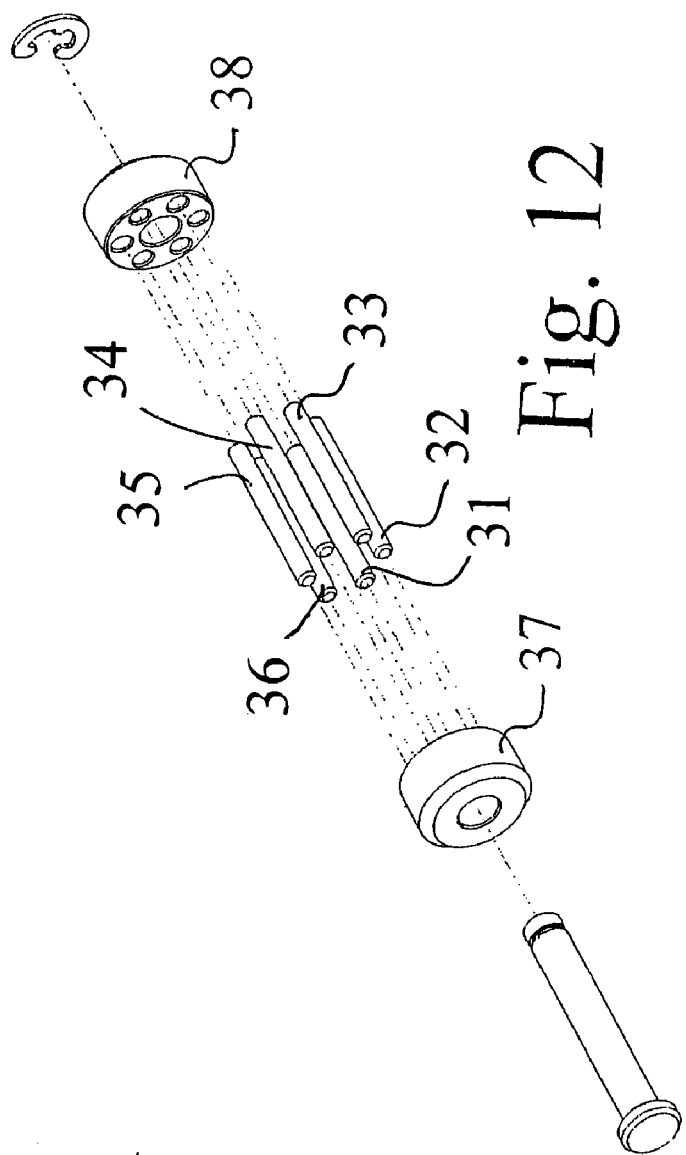
FIG. 12 is an exploded view of the inner blade support hub shown in FIG. 2.

The inner blade support hub 30 positioned preferably at the center of ring 20 is shown in FIGS. 2 and 12. The embodiment shown in FIGS. 2 and 12 includes a first blade support means comprising a plurality of pins 31-36. Pins 31-36 are securely anchored in lower hub 37 and upper hub 38. Pins 31-36 extend along the apex of each blade 41-46 and are in contact along the full width of both legs of each blade, as shown by pin 34 in FIG. 5. Pins 31-36 hold the apex of each blade, and the blade tensioning means 80 tensions the outer ends of each blade 41-46 against pins 31-36, respectively. Pins 31-36 extend across the entire width of each blade, and provide maximum resistance to bending, twisting or warping of the blades.

Figure 14:
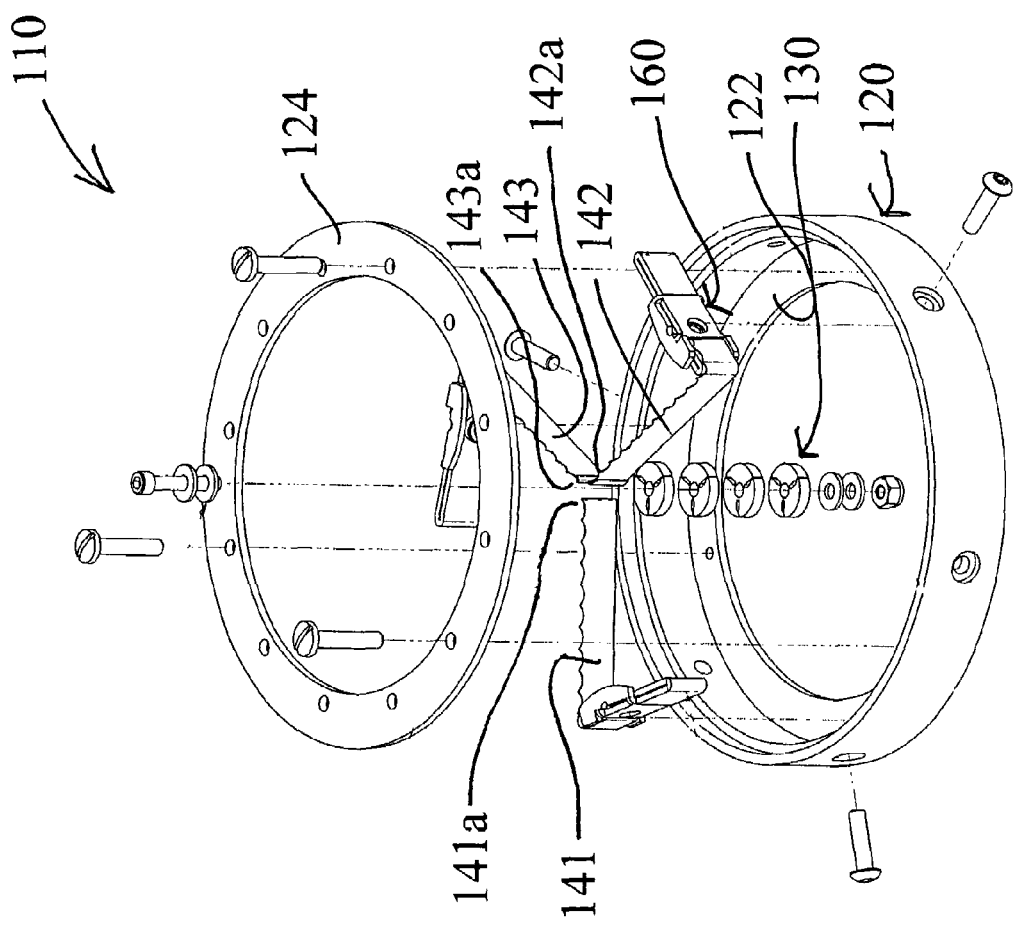
FIG. 14 is an exploded view of the embodiment shown in FIG. 13.
Figure 13:
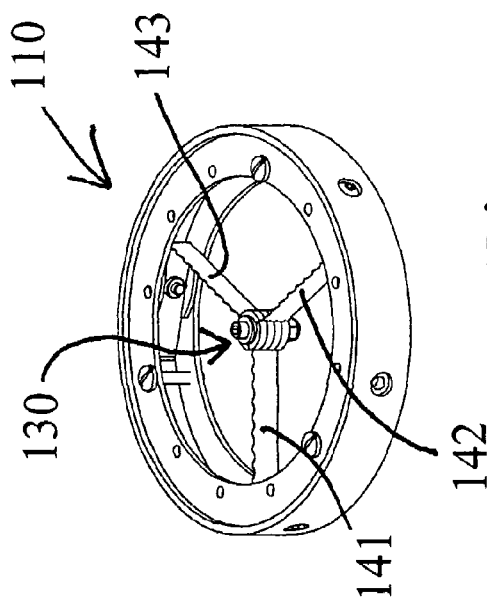
FIG. 13 is a perspective view of a second embodiment of the invention, wherein a plurality of three single blades is utilized.
Figure 15:
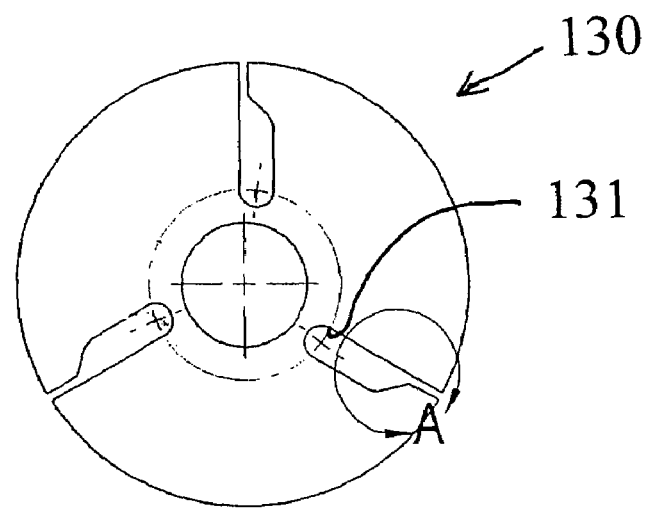
FIG. 15 is a plan view of the inner blade support hub 30 illustrating a "wedge-lock" design of the first blade support means.

FIGS. 13-17 illustrate a second embodiment of the invention. FIG. 13 is a perspective view of a fully assembled slicer 110, and FIG. 14 is an exploded view. The primary difference between the second embodiment shown in FIGS. 13-17 and the first embodiment shown in FIGS. 1-12 is that the second embodiment uses a plurality of three single blades 141-143 as opposed to the V-shaped "double" blades 41-46 of the first embodiment. The V-shaped "double" blades 41-46 of the first embodiment make two wedge shaped apple slices per blade, whereas the single blades 141-143 will create the same number of wedge shaped apple slices as there are blades. A secondary difference is the design of the inner hub 130 and the first blade support means described below.

Figure 16:
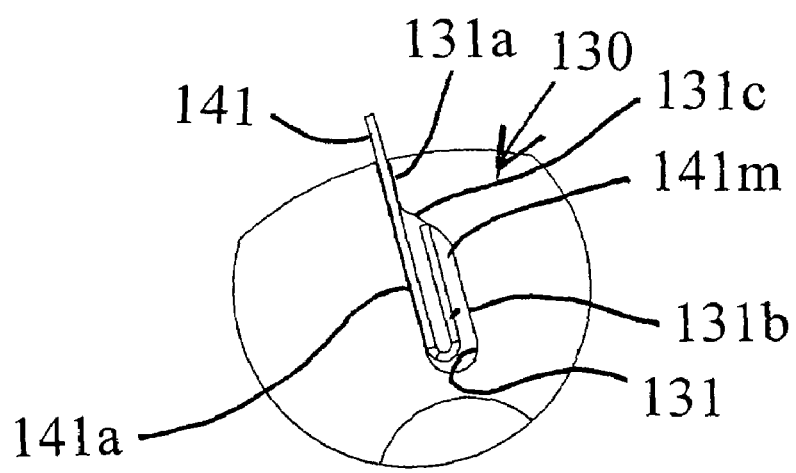
FIG. 16 is a closeup view of the circled portion of FIG. 15.

The three blades 141-143 each have an inner end 141a-143a connected to inner hub 130. FIG. 16 shows in greater detail the inner end 141a of blade 141. The inner end 141a is formed with a bent tab 141m bent through 180° to fold back against the blade 141. Blades 142 and 143 have identical bent tabs formed at their inner ends. The inner hub 130 has a series of blade wedge slots 131-133 formed therein to receive and support blades 141-143 and the bent tab on each blade. Wedge slot 131 includes a first slit or passageway 131a which slidably receives blade 141 and an enlarged opening or passageway 131b which slidably receives the bent tab 141m. As blade 141 is tensioned, the bent tab 141m bears against the tapered surface 131c of slot 131. Tapered surface 131c forms an obtuse angle with blade 141. Slot 131 and tapered surface 131c extend across the entire width "w" of blade 141 and provides rigid support against bending, twisting and warping of blade 141.

Slot 131 and bent tab 141m comprise the "first blade support means" within the meaning of the claims. The clinch buckle means 160 is the same as clinch buckle 60 described above, and is not described in detail here for brevity. The three clinch buckles 160 used in the three single blade assembly 110 are all "captured" between lower flange 122 and top ring 124 of cylindrical outer support ring 120, are thereby prevented from rotating to allow blades 141-143 to bend, twist or warp.

Figure 17:
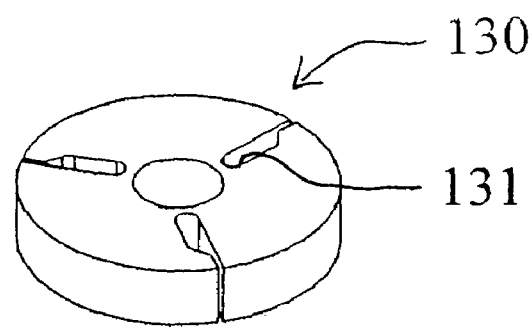
FIG. 17 is a perspective view of the inner blade support hub of FIG. 14.
Figure 18:
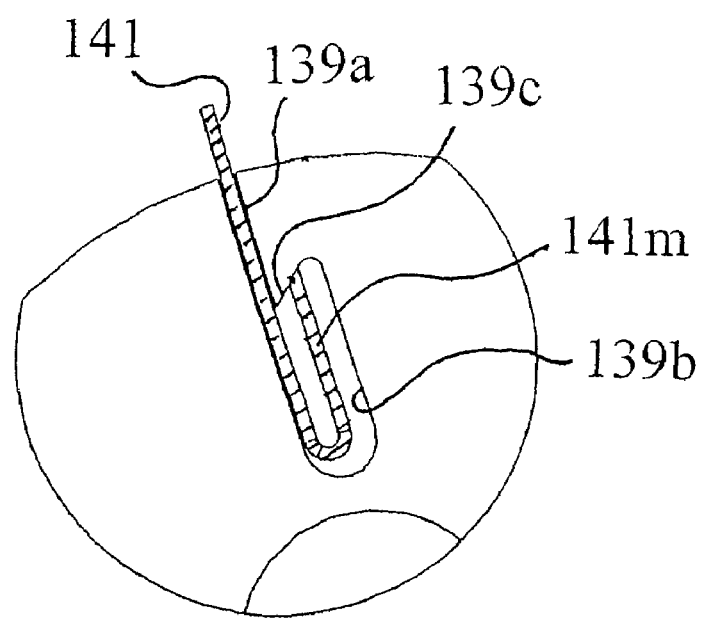
FIG. 18 is a closeup view of an alternate inner blade support means utilizing a "taper-lock" design.
Figure 20:
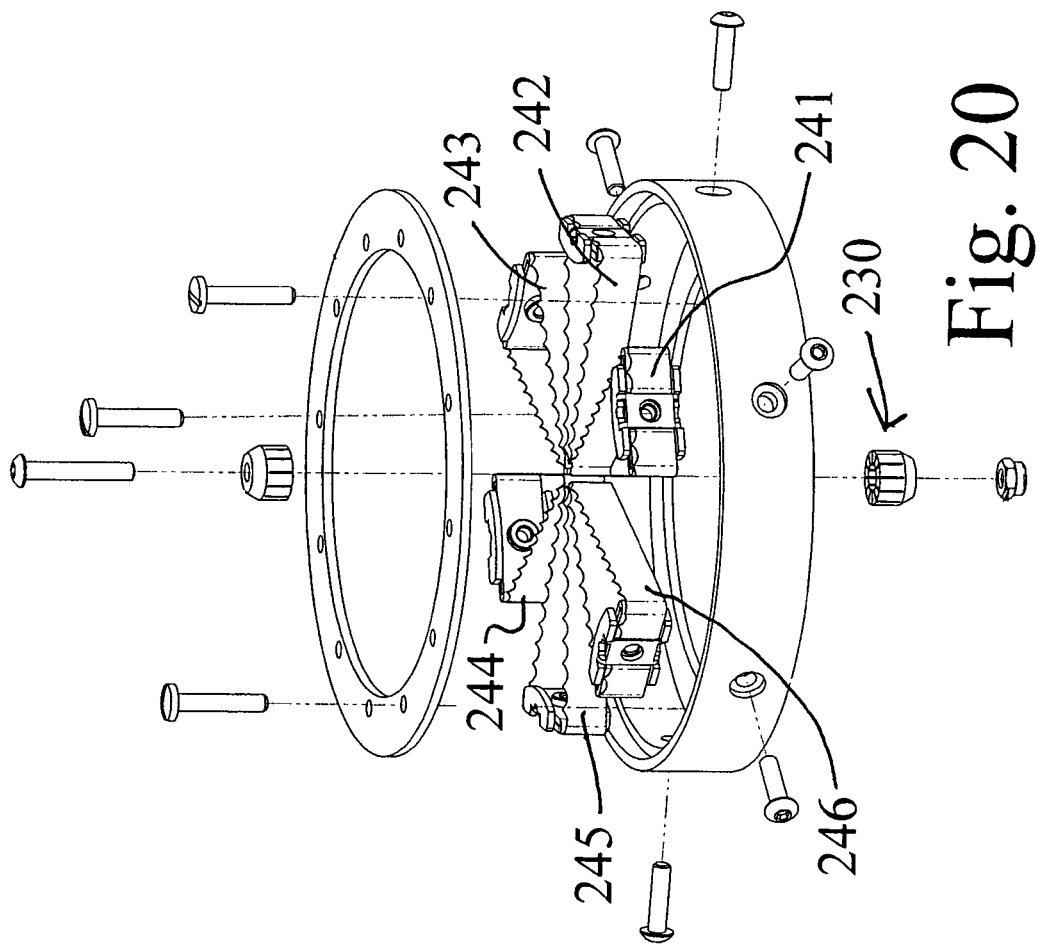
FIG. 20 is an exploded view of FIG. 19.
Figure 19:
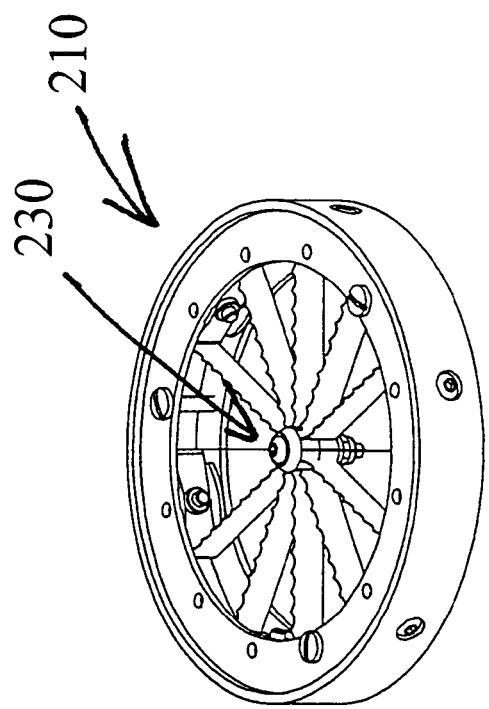
FIG. 19 is a perspective view of an assembled third embodiment of the invention utilizing a slotted hub design as an alternate first blade support means.

FIG. 18 illustrates a "taper-lock" slot 139, which is a variation of the "wedge" slot 131 of FIG. 17. The "taper-lock" slot 139 includes a first slit or passageway 139a which slidably receives blade 141, and an enlarged opening 139b which slidable receives bent tab 141m. Inclined surface 139c forms an acute angle formed by the inclined surface 139c (FIG. 18) with blade 141. The "taper-lock" slot 139 and bent tab 141m form the "first blade support means" within the meaning of the claims.

FIGS. 19-23 illustrate a third embodiment of the invention. The slicer assembly 210 has only one significant difference from assembly 10 shown in FIGS. 1-11. The difference is that the inner hub 230 is "slotted" with 12 slots 231-242 to receive the 12 legs of 6 V-shaped blades 241-246. A circular recess 271 is formed in inner hub 230 to slidably receive the apex of each of V-shaped blades 241-246. The slotted hub 230 forms the "first blade support means" within the meaning of the claims.

Figure 26:
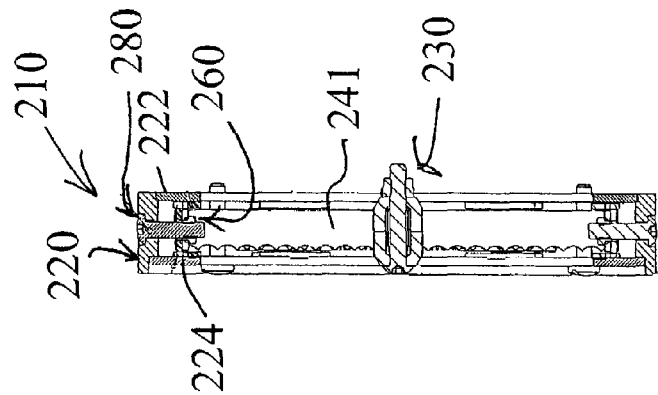
FIG. 26 is a section on the line 26-26 of FIG. 24.
Figure 24:
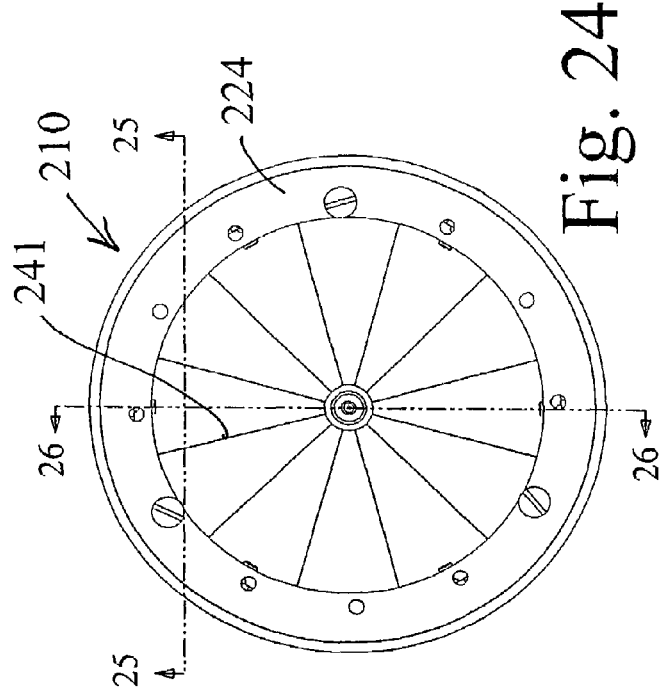
FIG. 24 is a plan view of the third embodiment of the invention shown in FIGS. 19 and 20.
Figure 25:
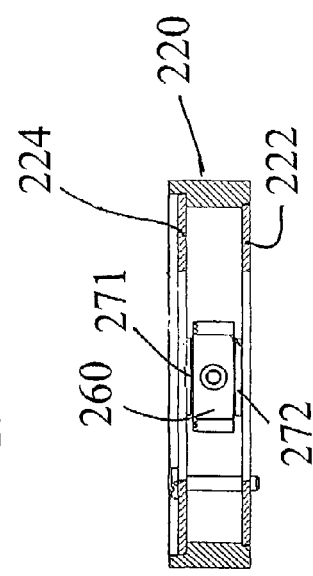
FIG. 25 is a section on the line 25-25 of FIG. 24.

FIGS. 24-26 illustrate plan and sectional views of the third embodiment slicer 210. FIG. 26 illustrates in cross-section how the tensioning means 280 draws clinch buckle 260 away from inner hub 230 and toward outer support ring 220. Lower flange 222 and top ring 224 are shown "capturing" clinch buckle 260 to support it and keep it from rotating. FIG. 25 also illustrates how the top and bottom flanges 271, 272 of clinch buckle 260 are contacted by and captured by lower flange 222 and top ring 224 of outer support ring 220 to prevent clinch buckle 260 from rotating, thereby maximizing the resistance of blade 241 to bending, twisting and warping.

The blades 41-46, 141-143 and 241-246 are preferably serrated. The serrations may include various bevel designs as known in the art. The serrated nature of the blades helps minimize the number of cells ruptured during the slicing operation. It is significant to note that the clinch buckle means 60, 160 and 260 are designed to function with either serrated blades as shown or with flat, non-serrated blades.

Figure 27:
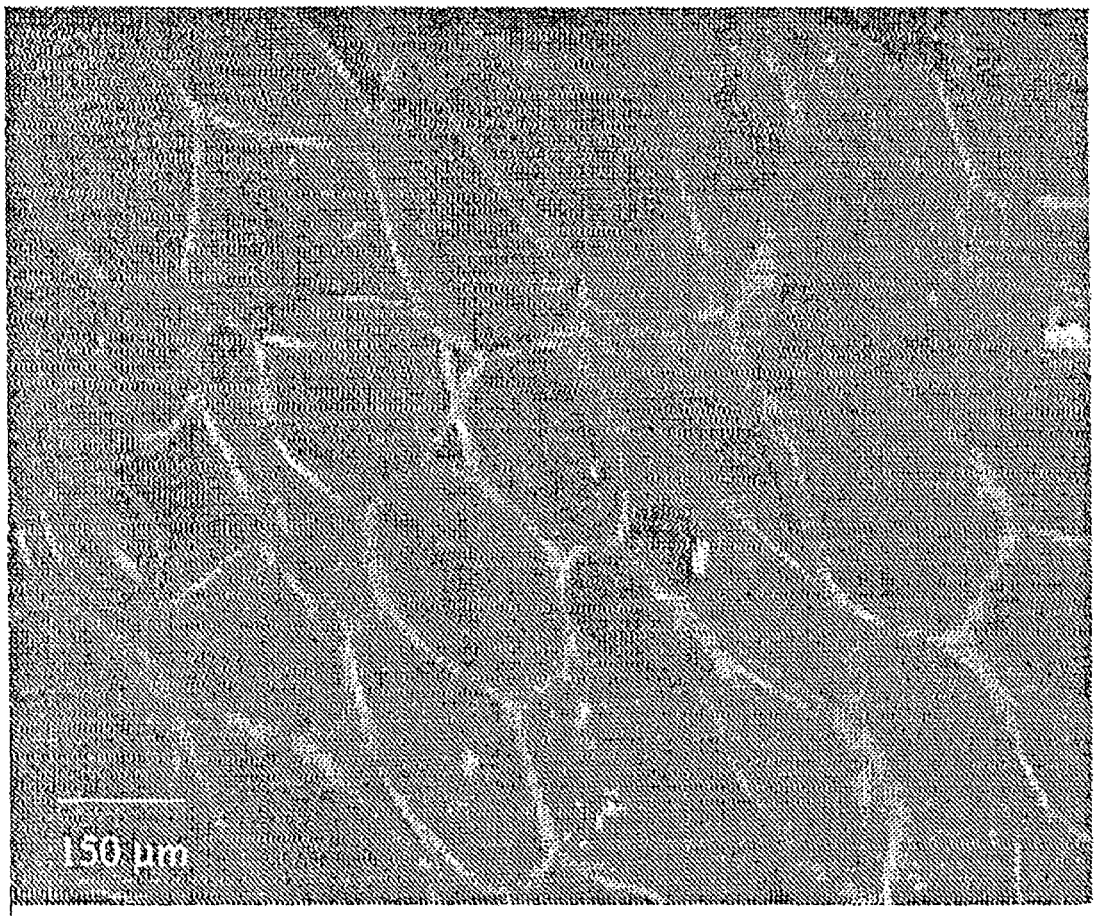
FIG. 27 is a reproduction of an image of apple cell walls stained with methylene blue.

FIG. 27, as noted above at page 3, is a microscopic image of apple cells stained with methylene blue.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. In an apparatus for automatically slicing apples into a plurality of wedge shaped segments, wherein said apparatus has a circular array of blades, the improvement wherein:
   said circular array of blades is a plurality of V-shaped blades, each of said blades having first and second legs and an apex having an apex angle formed by said first and second legs, and having first and second tips at the ends of said first and second legs, respectively, and
   first and second bent tabs formed at said tips of each of said legs,
   each of said blades and said bent tabs being a single, continuous strip of stainless steel,
   each of said stainless steel blades having a thickness less than 300 microns, and further comprising
   clinch buckle means for each of said V-shaped blades for rigidly connecting said first and second bent tabs of each blade to each other, wherein each clinch buckle means includes a clinch plate extending between said first and second bent tabs, a buckle supporting said clinch plate, and also including a rigid connection between said bent tabs and said clinch plate,
   an outer support ring for carrying each of said clinch buckle means wherein each of said clinch buckle means is free to move radially inwardly or outwardly, but is constrained by said outer support ring from other motion,
   an inner hub supporting each of said blades at the apex formed by said first and second legs, and
   blade tensioning means connecting each of said clinch buckle means to said outer support ring, wherein actuation of one of said blade tensioning means causes one of said clinch buckle means to move radially inwardly or outwardly.

2. The apparatus of claim 1 wherein each of said first and second bent tabs is double folded, and wherein each of said clinch plates has folded ears to slidably engage each of said double folded bent tabs.

3. The apparatus of claim 1 wherein the thickness of each of said V-shaped blades is between 180 microns and 220 microns.

4. The apparatus of claim 3 wherein each of said blades is serrated.

5. The apparatus of claim 2 wherein said connecting means comprises fillet welds.

6. The apparatus of claim 2 wherein said inner hub has a plurality of pins, wherein each of said pins supports said apex of one of said V-shaped blades.

7. The apparatus of claim 1 wherein said clinch buckle means has a body with top and bottom flanges, and wherein said flanges extend across the top and bottom of said clinch plate.

8. In an apparatus for automatically slicing apples into a plurality of wedge shaped segments, wherein said apparatus has a circular array of blades, the improvement wherein:
   said circular array of blades is a plurality of V-shaped blades, each of said blades having first and second legs and an apex having an apex angle formed by said first and second legs, and having first and second tips at the ends of said first and second legs, respectively,
   each of said blades is a single, continuous strip of stainless steel having a thickness between 180 and 220 microns and
   first and second bent tabs formed at said tips of each of said legs, and further comprising
   a clinch plate extending between said first and second bent tabs of each of said V-shaped blade,
   a buckle for each of said V-shaped blades, said buckle having top and bottom flanges,
   each of said clinch plates being mounted between said flanges of one of said buckles,
   connecting means for rigidly connecting said bent tabs of each of said V-shaped blade tips together with one of said clinch plates and one of said buckles,
   an outer support ring which supports each of said buckles, said outer support ring having a lower flange and a top ring which together capture said top and bottom flange of each buckle, but wherein each buckle is free to move radially relative to said outer ring,
   an inner hub supporting each of said blades at the apex formed by said first and second legs, and
   blade tensioning means connecting each of said buckles to said outer support ring, wherein actuation of said blade tensioning means causes each buckle to move radially inwardly or outwardly relative to the center of said outer support ring.

* * * * *